(12) United States Patent
Angelow et al.

(10) Patent No.: US 9,628,327 B2
(45) Date of Patent: Apr. 18, 2017

(54) METHOD AND NETWORK INFRASTRUCTURE FOR THE REDUNDANT TRANSMISSION OF MESSAGES IN A DISTRIBUTED REAL-TIME SYSTEM

(71) Applicant: FTS COMPUTERTECHNIK GMBH, Vienna (AT)

(72) Inventors: Harald Angelow, Vienna (AT); Wilfried Steiner, Vienna (AT); Günther Bauer, Vienna (AT)

(73) Assignee: FTS COMPUTERTECHNIK GMBH, Vienna (AT)

( * ) Notice: Subject to any disclaimer, the term of this patent is extended or adjusted under 35 U.S.C. 154(b) by 89 days.

(21) Appl. No.: 14/771,351

(22) PCT Filed: Mar. 6, 2014

(86) PCT No.: PCT/AT2014/050055
§ 371 (c)(1),
(2) Date: Aug. 28, 2015

(87) PCT Pub. No.: WO2014/134652
PCT Pub. Date: Sep. 12, 2014

(65) Prior Publication Data
US 2016/0006602 A1 Jan. 7, 2016

(30) Foreign Application Priority Data

Mar. 7, 2013 (AT) ............................... A 50159/2013
May 8, 2013 (AT) ............................... A 50315/2013

(51) Int. Cl.
*H04L 1/00* (2006.01)
*H04L 12/24* (2006.01)
(Continued)

(52) U.S. Cl.
CPC ............ *H04L 41/0663* (2013.01); *H04L 1/08* (2013.01); *H04L 12/1886* (2013.01);
(Continued)

(58) Field of Classification Search
CPC ....... H04L 45/24; H04L 47/286; H04J 3/0647
(Continued)

(56) References Cited

U.S. PATENT DOCUMENTS

2010/0054229 A1* 3/2010 Thoumy ................ H01Q 21/06
370/347
2010/0166006 A1* 7/2010 Xu ........................ H04L 1/0009
370/401

(Continued)

*Primary Examiner* — Faisal Choudhury
(74) *Attorney, Agent, or Firm* — Eversheds Sutherland (US) LLP

(57) ABSTRACT

The invention relates to a method for the redundant transmission of messages in a distributed real-time system, wherein the real-time system comprises two or more computing nodes (101-108) and one or more star couplers (201-209), wherein the computing nodes (101-108) are connected to the star couplers (201-209) by means of bidirectional communication lines (301, 302, 303) and the star couplers (201-209) are interconnected by bidirectional communication lines (310), and wherein the star couplers (201-209) connected by the communication lines (310) form a network infrastructure (200), wherein one or more star couplers (201-209) of the network infrastructure (200) perform one or more activity rasters (1000), wherein an activity raster (1000) consists of alternating active phases (502) and rest phases (501), and wherein any message sent in the network infrastructure is assigned to precisely one activity raster (1000). The invention also relates to a network infrastructure and also a real-time system comprising a network infrastructure of this type.

56 Claims, 6 Drawing Sheets

Figure 1:
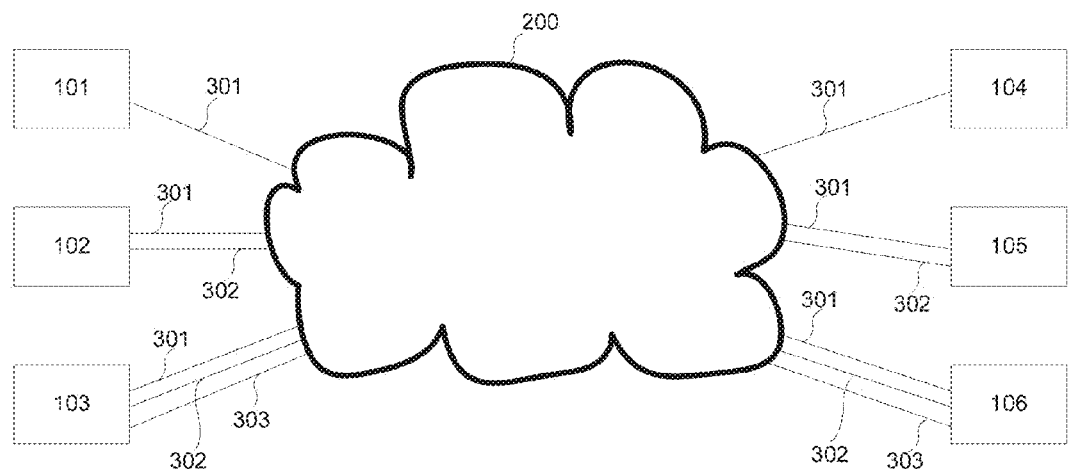

(51) Int. Cl.
  *H04L 1/08* (2006.01)
  *H04L 12/18* (2006.01)
  *H04L 12/44* (2006.01)
  *H04L 12/703* (2013.01)
  *H04L 12/721* (2013.01)
  *H04L 12/707* (2013.01)
  *H04L 12/841* (2013.01)
  *H04J 3/06* (2006.01)

(52) U.S. Cl.
  CPC .......... *H04L 12/44* (2013.01); *H04L 41/0836* (2013.01); *H04L 45/28* (2013.01); *H04J 3/0647* (2013.01); *H04L 45/24* (2013.01); *H04L 45/32* (2013.01); *H04L 47/286* (2013.01)

(58) Field of Classification Search
  USPC ........................................................ 370/226
  See application file for complete search history.

(56) References Cited

U.S. PATENT DOCUMENTS

| | | | | |
|---|---|---|---|---|
| 2013/0195011 | A1* | 8/2013 | Kikuzuki | H04W 4/00 370/328 |
| 2013/0215885 | A1* | 8/2013 | Vijayasankar | H04L 1/0041 370/389 |
| 2014/0050078 | A1* | 2/2014 | Sato | H04L 41/0654 370/228 |
| 2014/0169349 | A1* | 6/2014 | Vyas | H04W 84/12 370/338 |

* cited by examiner

METHOD AND NETWORK INFRASTRUCTURE FOR THE REDUNDANT TRANSMISSION OF MESSAGES IN A DISTRIBUTED REAL-TIME SYSTEM

The invention relates to a method for the redundant transmission of messages in a distributed real-time system, wherein the real-time system comprises two or more computing nodes and one or more star couplers, wherein the computing nodes are connected to the star couplers by means of bidirectional communication lines, and the star couplers are interconnected by bidirectional communication lines, and wherein the star couplers connected by the communication lines form a network infrastructure, and wherein at least some of the messages are sent redundantly, and wherein messages belonging to a message stream have the same identity.

The invention also relates to a network infrastructure for a distributed real-time system, wherein the real-time system comprises two or more computing nodes and one or more star couplers, wherein the computing nodes are connected to the star couplers by means of bidirectional communication lines, and the star couplers are interconnected by bidirectional communication lines, and wherein the network infrastructure is formed by the star couplers connected by the communication lines, and wherein at least some of the messages are sent redundantly, and wherein messages belonging to a message stream have the same identity.

Lastly, the invention also relates to a distributed real-time system comprising two or more computing nodes and one or more star couplers, wherein the computing nodes are connected to the star couplers by means of bidirectional communication lines and the star couplers are interconnected by bidirectional communication lines, and wherein a network infrastructure is formed by the star couplers connected by the communication lines.

To send a message redundantly means here that two or more identical copies of this message are sent. Senders of messages may be computing nodes or star couplers. The receiver of a message may also be a computing node or a star coupler.

Specifically, the invention lies in the field of distributed real-time systems, wherein a real-time system of this type comprises or consists of two types of active components: computing nodes and star couplers. Computing nodes execute functions, such as the measurement of properties of physical processes by means of suitable sensors, the calculation of control variables, or the activation of actuators, such as valves. Computing nodes are connected to other computing nodes and/or star couplers by means of bidirectional lines. Furthermore, star couplers may also be interconnected by bidirectional lines. The information exchange between components functions in a message-oriented manner, and, without loss of generality, it will be assumed in the following description that the information exchange uses Ethernet messages. Messages may have different identities, and all messages with the same identity form a "message stream".

Furthermore, some of the components and possibly all components of the distributed real-time system have access to a global timebase. In other words, the components of the distributed real-time system have local clocks, which are synchronised to one another. The maximum difference between two non-defective clocks in the distributed real-time system can be calculated. This maximum difference is designated here as the accuracy of the clocks in the distributed real-time system. Typical values for the accuracy lie in the range of single-digit microseconds, but may absolutely lie therebelow or thereabove.

The present invention relates to the management of serial and parallel redundancy in a distributed real-time system of this type.

Serial redundancy implements a functionality that is only performed when the system is in a fault situation. In other words, only when faults occur in the system, the redundancy function is performed. A scenario of serial redundancy is as follows: a message of a message stream is sent along a predefined route in a network. If this route is faulty and is no longer available, then a rerouting algorithm is executed, which serves to find an alternative route compared with the route that is now faulty. If such a route is found, the message and future messages of the message stream are then sent along the new route.

Parallel redundancy implements a functionality that is always performed, i.e. also in a fault-free situation. In other words, if a fault occurs, no additional functionality has to be performed. In the above scenario, parallel redundancy can be implemented in such a way that the messages of a message stream are always sent via two mutually independent routes through the network.

Thus, two redundant copies of the messages of the message current are sent through the network.

Whereas serial redundancy performs a functionality only in the event of a fault, the functionality is always performed in the case of parallel redundancy.

If parallel redundancy (sometimes also with serial redundancy) is implemented in a network for a distributed real-time computer system, part of the redundancy functionality is thus a function that identifies redundant copies of a message. If information is sent in the form of two copies along two routes in the network, a receiver of the two messages must then be able to determine that these two messages are copies of the same information. This problem is increasingly complex in a system that sends information in the form of a sequence of messages. In other words, the redundancy function must distinguish between new information and known information, i.e. whether received messages contain different information or the same information, for example.

Existing solutions for redundancy management often use sequence numbers in order to solve this problem. Here, the redundant messages, which contain the same information, are provided with the same number, or what is known as the sequence number.

When new information has to be sent, this information is thus packaged in redundant messages which have the same sequence number and of which the sequence number is greater by a value, for example one, than the sequence number of the previous redundant messages. In other words, a receiver locally stores a list of the last sequence numbers and then only accepts a message as new information when the sequence number of the message is sufficiently different from the last received sequence number. Put simply, this means that a receiver interprets a message as new information when the sequence number is higher than the last received message of this type, and rejects the message when the sequence number of the message is identical to the last received of this message. In practice this simplified principle is slightly more complicated, since sequence numbers may experience a rollover, i.e. when the sequence number reaches a maximum value, the subsequent sequence number is an initial value, for example one.

In practice, a window of valid sequence numbers is additionally defined relative to the last received message assessed by a receiver as new information.

One object of the invention is to specify a method and supporting hardware, with which a redundancy service can be formed in a distributed real-time computer system in order to tolerate occurring hardware failures.

A further object of the invention is to specify a solution for providing a network infrastructure with which the robustness with respect to disruptions is increased by means of a redundancy mechanism.

These objects are achieved with a method of the type mentioned in the introduction in that, in accordance with the invention, one or more activity rasters are performed by one or more star couplers of the network infrastructure, wherein an activity raster in each case consists of alternating active phases and rest phases, wherein all active phases of an activity raster have the same active phase duration, and wherein all rest phases of an activity raster have the same rest phase duration, and wherein the activity phase duration and the rest phase duration of an activity raster may be the same or different, and wherein each message sent in the network infrastructure is assigned in accordance with its identity to precisely one activity raster by the star coupler(s), and wherein the messages are sent only in active phases, such that a receiver, when receiving messages, detects that the messages are redundant copies of the same message when the receiver receives messages with the same identity within a time interval, which time interval has a duration corresponding to the active phase duration of the activity raster for messages having this identity.

These objects are also achieved with a network infrastructure of the type mentioned in the introduction in that, in accordance with the invention, for the redundant transmission of messages in the real-time system, one or more star couplers of the network infrastructure is/are configured to perform one or more activity rasters, wherein an activity raster consists of alternating active phases and rest phases, wherein all active phases of an activity raster have the same active phase duration, and wherein all rest phases of an activity raster have the same rest phase duration, and wherein the activity phase duration and the rest phase duration of an activity raster may be the same or different, and wherein the start coupler(s) is/are configured to assign each message sent in the network infrastructure in accordance with its identity to precisely one activity raster such that the messages are sent only in active phases, such that a receiver receiving messages identifies that the messages are redundant copies of the same message when the receiver receives messages with the same identity within a time interval, which time interval has a duration corresponding to the active phase duration of the activity raster for messages having this identity.

These objects are also achieved with a real-time system comprising a network infrastructure of this type.

The redundancy service according to the invention is based on a novel use of what is known as a "sparse timebase".

This redundancy mechanism according to the invention also functions without the use of sequence numbers and uses a synchronised timebase, which is available at least to parts of the network infrastructure. The synchronised timebase is used as what is known as a "sparse timebase", by means of which a system-wide action raster can be constructed. This action raster consists of alternating activity phases and rest phases. Since the local clocks of the components are synchronised with one another, it is ensured that the components are located "approximately" at the same time in the same phases. The inaccuracy results from the inaccurate synchronisation of the local clocks with one another, i.e. it is ensured that when a non-defective local clock starts one of the phases, all other clocks in the worst case scenario have already been in this phase for a period of time corresponding to the accuracy, or only reach this phase when a period of time corresponding to the accuracy has elapsed. This action raster can be used to implement a redundancy mechanism as disclosed in this invention. Here, use is made of the fact that the network infrastructure delivers redundant messages, i.e. messages containing the same information, to the receiver only during the activity phase. On the basis of the length of time between the receipt of the messages, the receiver concludes whether the messages are redundant messages containing the same information. The rest phase between two successive activity phases allows the receiver to distinguish between redundant messages containing the same information and messages containing new information.

The disclosed method and implementation may therefore replace sequence numbers; it may also be used, however, in combination with sequence numbers. Furthermore, the disclosed method and implementation describes possibilities of how the network infrastructure can autonomously increase the reliability of the message transmission by multiple sending of messages and/or redundant copies thereof.

It is expedient when different activity rasters are performed for messages with different identity.

A receiver of messages, in particular a computing node, may use only a subset of messages within a time interval corresponding to the length of an activity phase of an activity raster and may reject the rest of the messages from this time interval. This may be configured in the hardware, for example. Here, the subset may comprise, for example, exactly one message of a plurality of redundant messages, which one message is used further, whereas the other associated redundant messages are rejected. However, the subset may also comprise a plurality of redundant messages, which means that two or more redundant messages may also be used further.

Further advantageous embodiments of the method according to the invention and of the network infrastructure and of the real-time systems are described hereinafter.

In accordance with a specific embodiment of the invention all star couplers that perform an activity raster associated with a certain message perform this activity raster in such a way that the star couplers are in an active phase or in a rest phase, either in a synchronised manner, i.e. approximately at the same time, or in a manner shifted over time by a defined phase.

Furthermore, it may be that a star coupler only forwards a message received from another star coupler when the moment of receipt and the moment of complete forwarding fall in an active phase of the activity raster belonging to the message.

It may be advantageous when the length of the active phase in an activity raster of a message is selected such that it is selected to be at least the maximum possible duration of one-time sending through the network infrastructure.

It may also be expedient when the length of the active phase in an activity raster of a message is selected such that it corresponds at least to the maximum possible time shift required by the copies of a redundant message through the network infrastructure over redundant paths.

It may also be favourable when the length of the active phase in an activity raster of a message is selected such that it corresponds at least to the maximum possible time shift required by the redundant copies of a message through the network infrastructure in both directions in a ring.

It may also be advantageous when the length of the rest phase of an activity raster corresponds at least to the length of the inaccuracy of the synchronisation of the local clocks of the distributed real-time system.

It may be expedient when the length of the rest phase of an activity raster is selected as a function of the associated active phase of the activity raster.

Here, it has proven to be favourable when the length of the rest phase of an activity raster is selected as an arithmetic multiple of the associated active phase of the activity raster.

In addition, it may be that the length of the active phase in an activity raster of a message is selected such that it is selected to be at least the maximum possible duration of the one-time sending of the message and also a configured number of repetitions through the network infrastructure.

It may also be advantageous when a star coupler forwards, twice or more, a message or the redundant copy of a message that it receives during an active phase of the associated activity raster.

Here, it may be expedient when the repeated forwarding of the message is performed only during the current active phase.

It may be advantageous to provide a defined time interval between two repetitions.

In addition it may be advantageous when the number of repetitions and/or the time interval between two repetitions can be configured.

It may also be advantageous, for example in order to reduce the total number of messages in the system, if a star coupler forwards precisely only one redundant copy of two or more redundant copies of a message received by the star coupler during an active phase of the associated activity raster.

By way of example, a star coupler forwards the first copy from the set of copies of a message that it receives during an active phase of the associated activity raster.

A star coupler may also forward the last copy from the set of copies of a message that it receives during an active phase of the associated activity raster.

Furthermore, a star coupler may forward exactly one copy from the set of copies of a message at a defined moment in the active phase of the associated activity raster.

In addition, a star coupler may forward the exactly one copy of the set of copies of a message at a configured or configurable time interval following the start of the receipt of this copy.

In particular, the configured time interval may correspond to the period of time required by the star coupler in order to decide to which computing nodes and/or other star couplers the star coupler must forward the message, or the configured time interval may correspond to the period of time for complete receipt of the copy.

In order to increase the fault tolerance in the transmission, a star coupler may also forward any subset of the redundant copies of a message.

If the computing nodes are not synchronised with the star couplers, a star coupler will then receive the messages from a computing node also in a rest phase.

It may then also be advantageous if one or more star couplers rejects/reject messages received directly from a computing node when the messages are received in the star coupler during a rest phase associated with the message.

It may also be expedient if one or more star couplers rejects/reject messages received directly from a computing node when the message is received in the star coupler during an active phase associated with the message, but the forwarding of this message cannot be completed in this active phase.

It may also be advantageous if one or more star couplers which receives/receive redundant copies of a message directly from a computing node together carry out an Agreement Protocol, and each of these star couplers separately identifies, in accordance with this Agreement Protocol, at most one activity phase during which the one or more redundant copies of the message is/are forwarded.

In accordance with a variant of the invention one or more star couplers distinguishes/distinguish between two groups of communication lines by means of which it/they is/are directly connected, wherein the least one star coupler, during an active phase of an activity raster of a message, forwards the message only at the communication lines of the first group, and during the rest phase of an activity raster of a message forwards the message only at the communication lines of the second group.

Here, it may be favourable if the length of the active phase in an activity raster of a message is selected in such a way that it corresponds at least to the period of time required by a message to be sent a defined number of times, for example exactly once, along a ring.

The expression "along a ring" here means that the message covers a complete lap.

In principle, it may be expedient if a star coupler implements one or more activity rasters by local clocks.

Here, it has proven to be expedient that the local clocks of different star couplers that implement one or more activity rasters are synchronised with one another.

Figure 3:
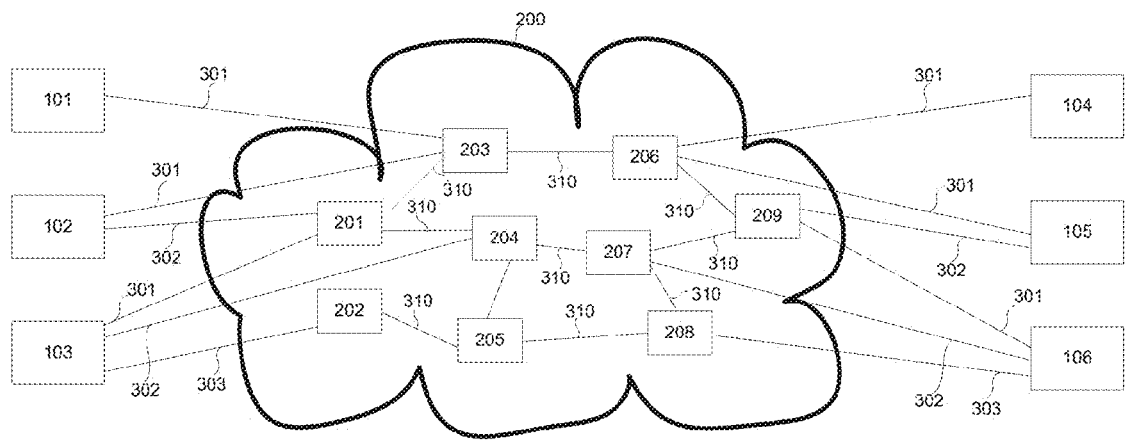
Figure 4:
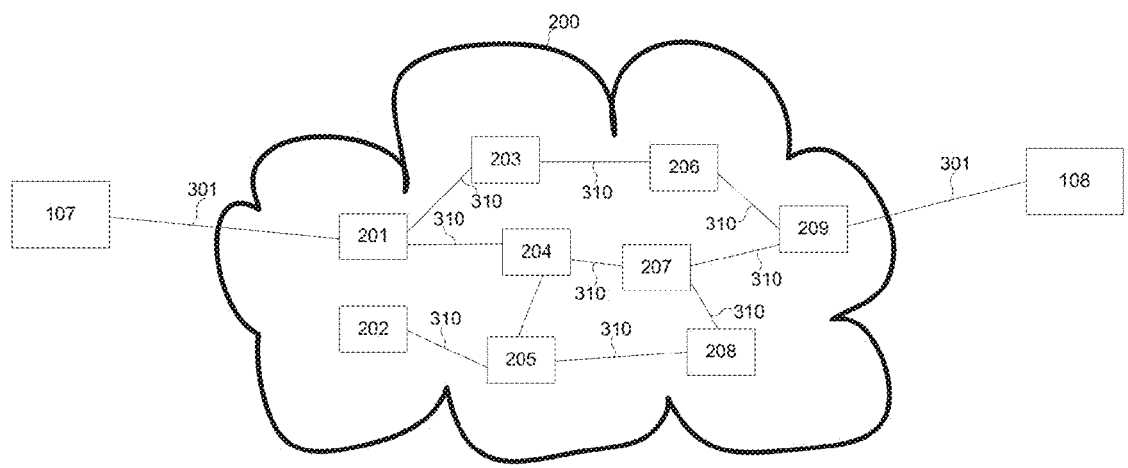
Figure 5:
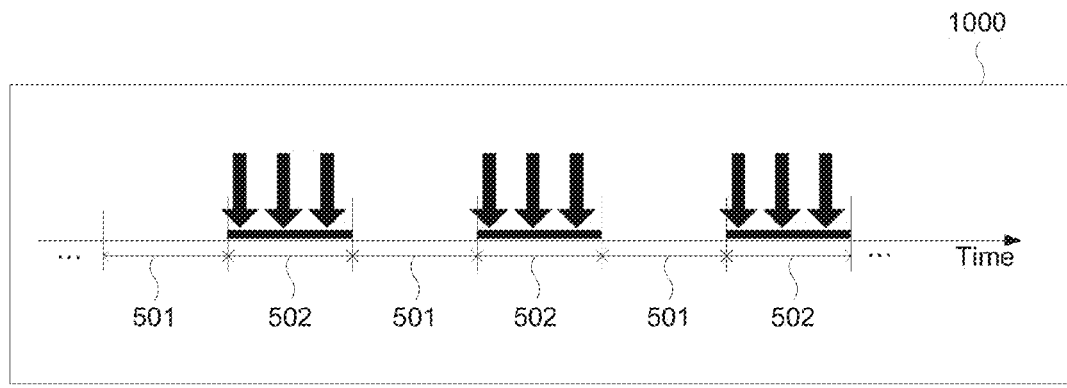
Figure 6:
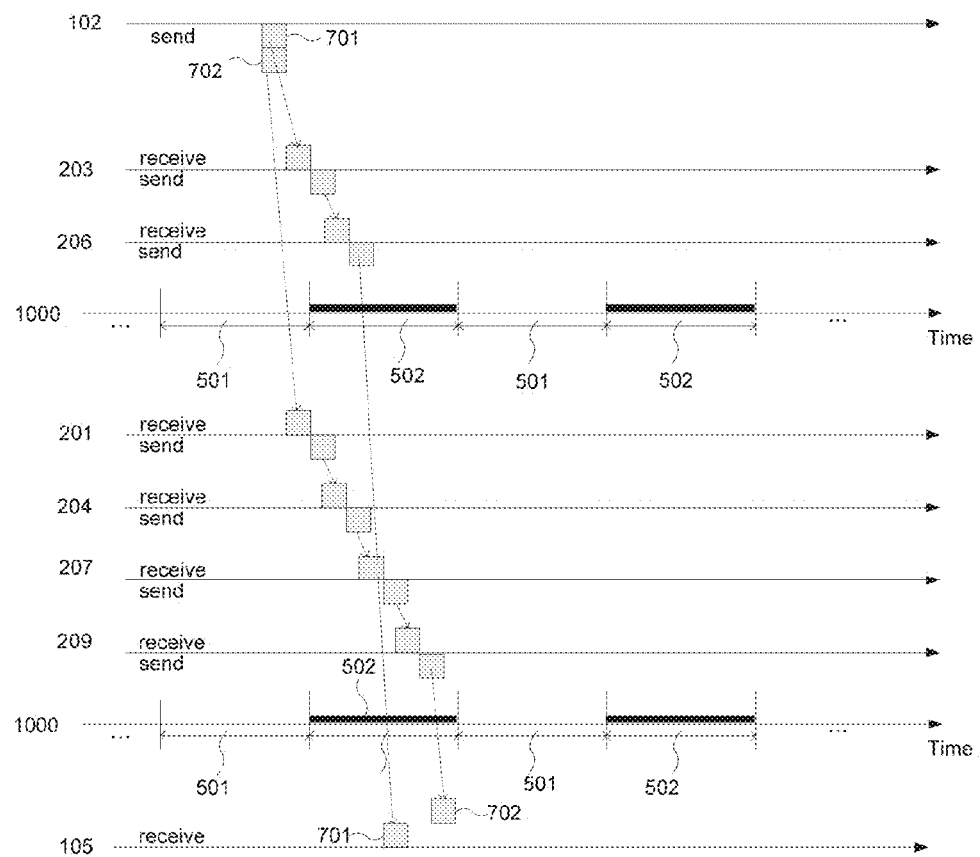
Figure 7:
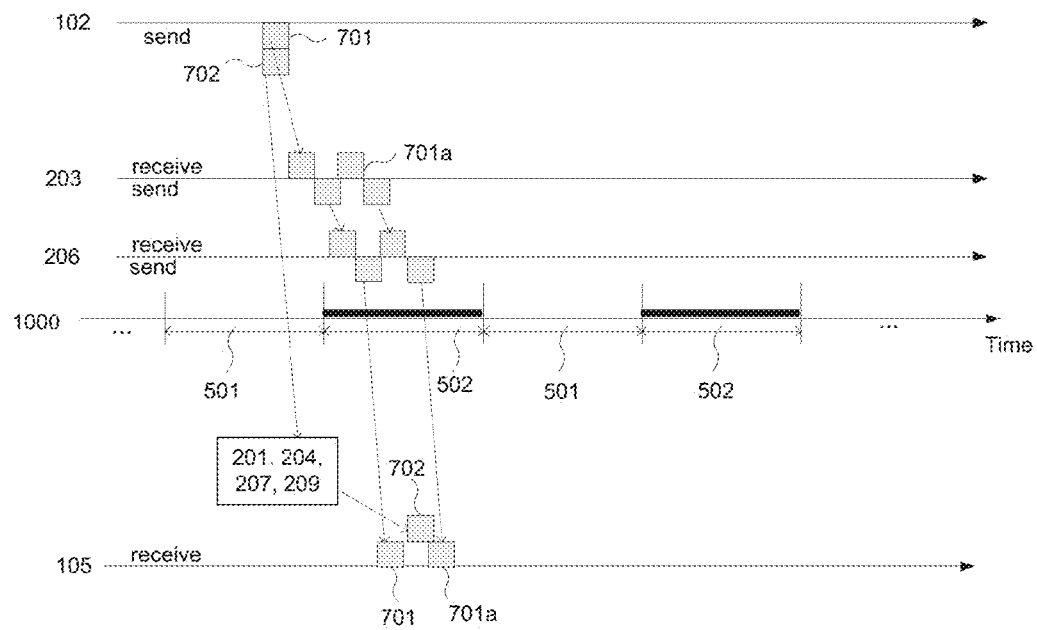
Figure 8:
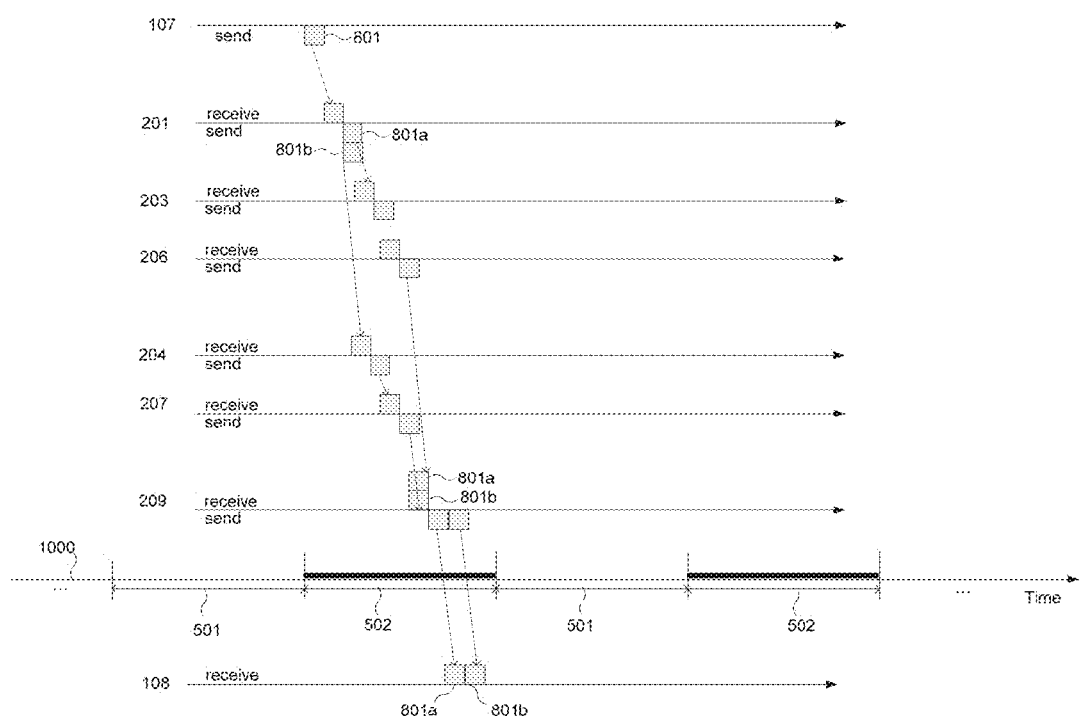
Figure 9:
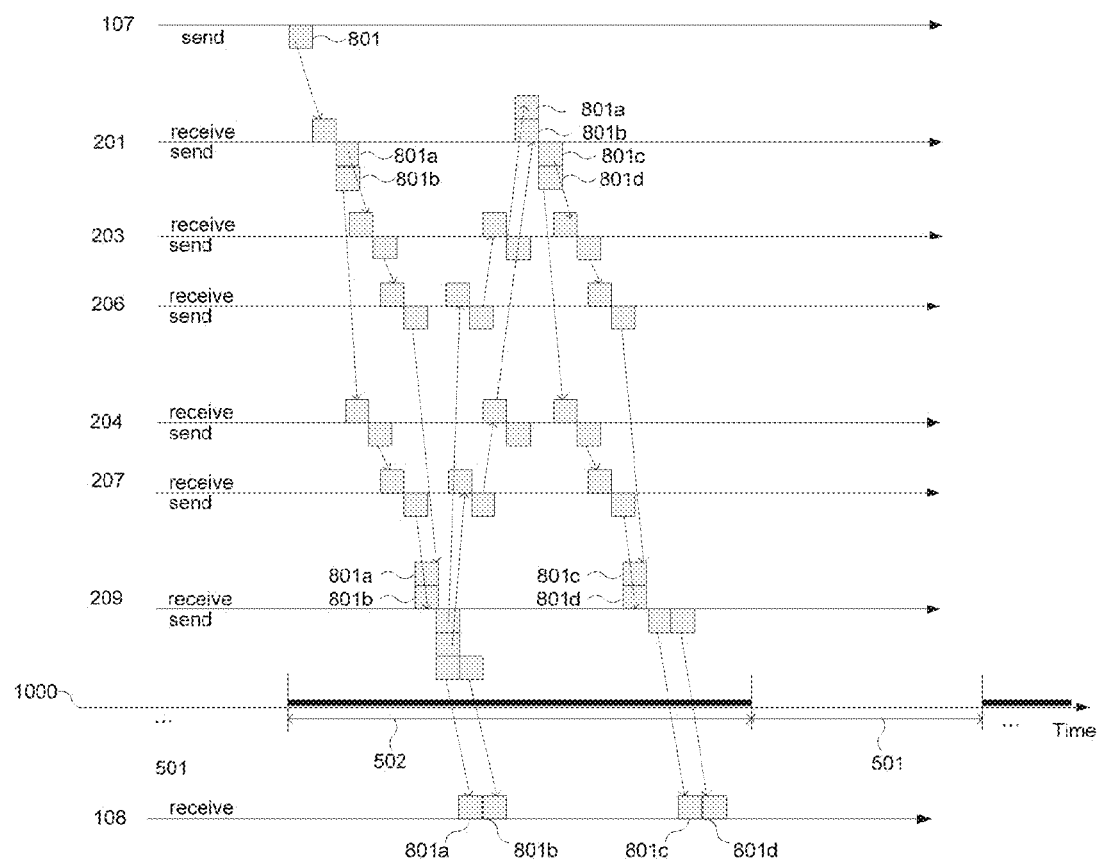
Figure 10:
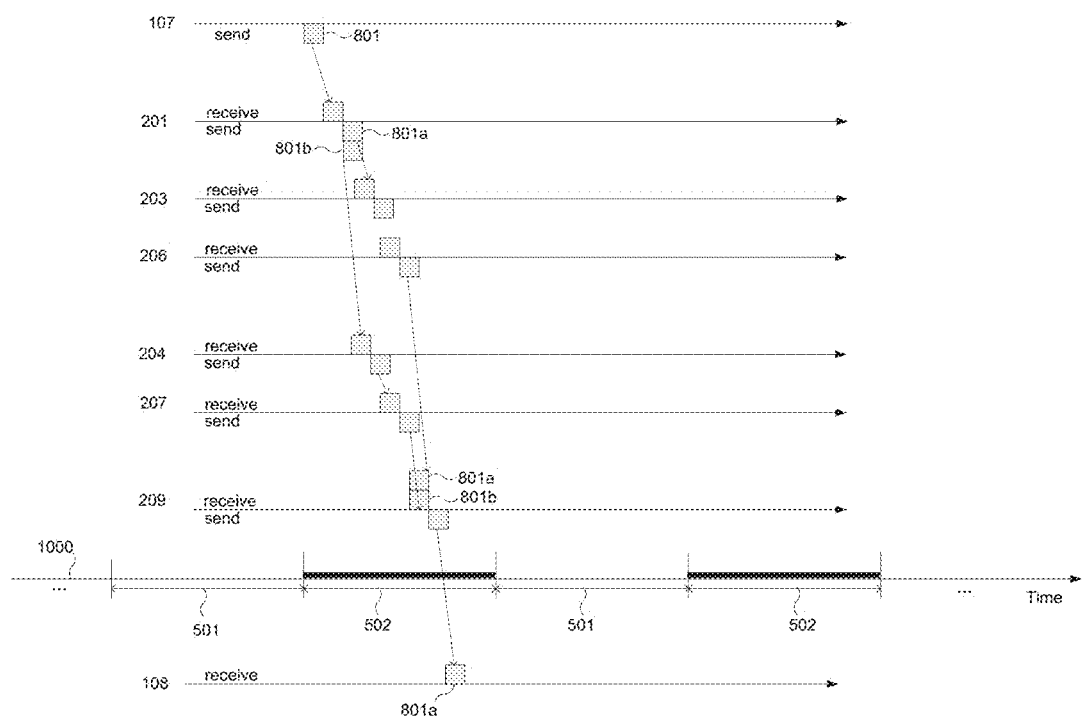

The invention will be explained in greater detail hereinafter on the basis of the drawing on the basis of an exemplary embodiment. In the drawing FIG. 1 shows an example of a network infrastructure and computing nodes, which are connected to the network infrastructure by means of bidirectional communication lines, FIG. 2 shows an example of an internal structure of a network infrastructure consisting of star couplers interconnected directly or indirectly by means of bidirectional communication lines, FIG. 3 shows an example for connecting computing nodes to the network infrastructure, FIG. 4 shows an example for connecting computing nodes to the network infrastructure, FIG. 5 shows an example of an action raster consisting of alternating active phases and rest phases, FIG. 6 shows an example of the application of the action raster for the purpose of redundancy management in a network infrastructure with redundant paths, FIG. 7 shows an example of the application of the action raster for the purpose of redundancy management in a network infrastructure with redundant paths and repeated sending of a message by a star coupler, FIG. 8 shows an example of the application of the action raster for the purpose of redundancy management in a network infrastructure with ring, FIG. 9 shows an example of the application of the action raster for the purpose of redundancy management in a network infrastructure with ring and multiple circulation of a message in the ring, and FIG. 10 shows an example of the application of the action raster for the purpose of redundancy management in a network infrastructure with ring, wherein merely one redundant copy of a plurality of redundant copies of a message is forwarded.

The following specific example concerns one of the many possible embodiments of the new method.

FIG. 1 illustrates an example of a network infrastructure 200 and computing nodes 101-106, which are connected by means of bidirectional communication lines 301-303 to the network infrastructure 200. The computing nodes are connected in this example to the network infrastructure 200 by a different number of communication lines 301-303: computing nodes 101 and 104 are connected to the network infrastructure by in each case one communication line 301, computing nodes 102 and 105 are connected to the network infrastructure by in each case two communication lines 301, 302, and computing nodes 103 and 106 are connected to the network infrastructure by in each case three communication lines 301, 302, 303. The number of allowed faulty communication lines and the type of fault thereof that may occur with maintained communication between the computing nodes and the network infrastructure can be directly concluded from the number of communication lines 301-303 by which a computing node 101-106 is connected to the network infrastructure 200. For example, two of the communication lines 301-303, by means of which computing node 103 is connected to the network infrastructure, may thus fail, and computing node 103 may nevertheless communicate (i.e. send and receive messages) with the network infrastructure via the remaining intact communication line.

Figure 2:
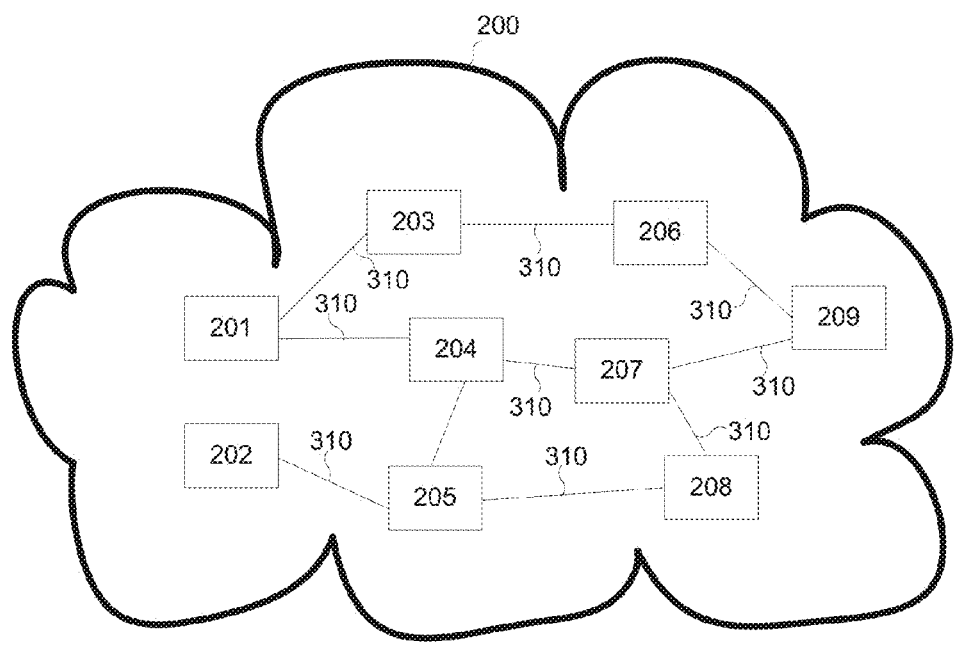

FIG. 2 illustrates an example for an internal structure of a network infrastructure consisting of star couplers 201-209, which are interconnected directly or indirectly by means of bidirectional communication lines 310. The internal structure of the network infrastructure 200 enables "redundant paths". For example, a computing node 102 may thus be connected to the star couplers 201 and 203, and a computing node 105 may be connected to the star couplers 206 and 209, as illustrated in FIG. 3. The network infrastructure in this case enables two mutually independent paths between the computing nodes 102 and 105: the first path is formed by the star couplers 203 and 206, the second path is formed for example by the star couplers 201, 204, 207 and 209. If one or more star couplers within a path then fails/fail, the other path will thus remain intact, and the computing nodes 102 and 105 may continue to communicate with one another.

Star couplers may also be interconnected cyclically by bidirectional communication lines, for example the star couplers 201, 203, 206, 209, 207, and 204 illustrated in FIG. 2. These star couplers in a configuration of this type form a "ring".

In general a star coupler may be part of a number of redundant paths and a number of rings, such as the star couplers 204 and 207 illustrated in FIG. 2. In this general case a star coupler may be configured such that the star coupler forwards messages at the communication lines to which it is directly connected.

FIG. 3 illustrates an example for connecting computing nodes 101-106 to the network infrastructure 200. Computing nodes 101 and 104 are connected to the network infrastructure by in each case only one communication line 301. Computing nodes 102 and 105 are connected to the network infrastructure 200 by in each case two communication lines 301 and 302. Computing nodes 102 and 105 may therefore communicate with one another via two redundant paths. The first redundant path for example may contain the star couplers 203 and 206, and the second redundant path for example may contain the star couplers 201, 204, 207 and 209. Computing nodes 103 and 106 are connected to the network infrastructure 200 by three communication lines 301, 302 and 303. The computing nodes 103 and 106 may therefore communicate with one another via three redundant paths. The redundant paths for example may be configured as follows: the first redundant path contains the star couplers 201, 203, 206 and 209; the second redundant part contains the star couplers 204 and 207; the third redundant path contains the star couplers 202, 205 and 208.

FIG. 4 illustrates an example for connecting computing nodes 107, 108 to the network infrastructure 200, wherein the star couplers 201, 203, 206, 209, 207 and 204 are configured as a ring. If a computing node sends messages to a star coupler that is part of a ring, the star coupler may thus send the messages in two directions, for example as shown in FIG. 2, the star coupler 201 may send the messages of the computing node 107 both to the star coupler 203 and to the star coupler 204. If a receiver of this message is then also connected to a star coupler of the ring, such as the computing node 108 connected to the star coupler 209, any star coupler between the star couplers 201 and 209 may thus fail, and the message transmission from computing node 107 to 108 is nevertheless guaranteed.

FIG. 5 illustrates an example of an action raster 1000 consisting of alternating active phases 502 and rest phases 501. The network infrastructure 200 sends redundantly transmitted messages only in active phases 502 to the receiver. The network infrastructure 200 may use exactly one activity raster of this type, or also more for messages of different message streams. The messages of a message stream preferably have the same identity, and messages of different message streams preferably have different identity. The length of the active phases 502 and of the rest phases 501 is given from the technical transmission possibilities of the network infrastructure, i.e. the quicker messages can be transmitted in the infrastructure and the smaller the time variation when doing so, the shorter can be configured the active phases 502 and the rest phases 501. The star couplers in the distributed real-time system preferably execute the action raster(s) synchronously or preferably with a fixedly defined phase distance.

Within an active phase 502, a star coupler may send the message a number of times. An example of this will be described in the context of FIG. 7. In addition, star couplers that are connected in a ring may circulate a message a number of times during an active phase. An example of this will be described in the context of FIG. 9. A star coupler that receives messages from another directly connected star coupler during a rest phase rejects these messages. A star coupler also deletes all redundant messages from the internal memory when a rest phase associated with these redundant messages starts. The rejection of messages from other star couplers means that messages may not circulate in a ring in an unlimited manner. The deletion of the redundant messages from the internal memory of a star coupler means that messages are not re-sent any number of times. Messages received by a star coupler from a computing node during a rest phase may selectively either be rejected or stored in the star coupler and sent in the next activity phase. If messages from computing nodes received by star couplers during the rest phase are not rejected and such messages are sent to star couplers in redundant paths, the star couplers thus execute what is known as an "Agreement Protocol" in order to ensure that these messages are delivered to the receiver during the same activity phase.

FIG. 6 illustrates an example of the application of the action raster 1000 for the purpose of redundancy management in a network infrastructure with redundant paths. FIG. 6 relates to the example of a network infrastructure from FIG. 3 and describes, by way of example, the application of an action raster as shown in FIG. 5 on the basis of the communication of computing nodes 102 and 105 via two redundant paths. FIG. 6 illustrates the flow of messages, wherein the course over time is to be interpreted from left to right. The scenario starts with the computing node 102, which sends two copies 701, 702 of a redundant message. The message 701 (i.e. copy 701 of the message) is sent to the star coupler 203, and message 702 (i.e. copy 702 of the message) is sent to the star coupler 201. The message 701 is then sent from the star coupler 203 to the star coupler 206. The star coupler 206 sends the message lastly to computing node 105. The message 702 is then sent from star coupler 201 to star coupler 204, from this to star coupler 207, and from this to star coupler 209. Star coupler 209 sends the message lastly to computing node 105. Two action rasters are illustrated in FIG. 6; the upper is executed by the star coupler 206, whereas the lower is executed by star coupler 209.

As illustrated in FIG. 6 and described with reference to FIG. 5, both star couplers 206 and 209 accept the message, since the moment of receipt, i.e. the moment at which the message has been fully received, lies within an activity phase. As illustrated, the activity phase 502 and the rest phase 501 of the activity raster 1000 are selected in such a way that it is ensured that both copies 701, 702 of the redundant message are sent in the same activity phase to the computing node 501. The receiver 105 identifies that the two messages 701, 702 are redundant.

FIG. 7 illustrates an example of the application of the action raster for the purpose of redundancy management in a network infrastructure having redundant paths and repeated sending of a message by a star coupler. The scenario as shown in FIG. 7 differs from that shown in FIG. 6 merely in the upper redundant path, which contains the star couplers 203 and 206. The lower redundant path corresponds to the illustration in FIG. 6 and is symbolised here in a simplified manner by the rectangle labelled by 201, 204, 207, 209. In the upper redundant path the message 701 is sent from computing node 102 to star coupler 203 and from this to star coupler 206. In addition, star coupler 203 retains the message in its local memory and sends it repeatedly to star coupler 206. In FIG. 7 this repeated sending is illustrated once and symbolised by the message 701a. FIG. 7 thus shows the special case that the message is only repeated once. Generally, the number of repetitions and time interval therebetween are defined per message and activity phase, and a user may thus configure the frequency with which the message is repeated and the duration of the time interval between the individual repetitions.

The star coupler 206 forwards all copies of the message to the computing node 105 during the active phase. In the rest phase following the active phase the star coupler 203 deletes the message from its internal memory in order to avoid an unlimited repetition of the sending.

FIG. 8 illustrates an example of the application of the action raster for the purpose of redundancy management in a network infrastructure with ring. FIG. 8 relates to the example of a network infrastructure in FIG. 4 and describes, in an exemplary manner on the basis of the communication of computing nodes 107 and 108 via a ring, the application of an action raster as shown in FIG. 5. As illustrated in FIG. 8, the computing node 107 sends a message to the star coupler 201. This star coupler 201 then forwards the message both to the star coupler 203 (symbolised as message 801a) and to the star coupler 204 (symbolised as message 801b). Star coupler 203 forwards the message 801a to star coupler 206, and this forwards the message 801a to the star coupler 209. Star coupler 204 forwards the message 801b to star coupler 207, and this forwards the message 801b likewise to star coupler 209. Star coupler 209 thus receives both redundant copies (801a and 801b) of the message 801. Since the star coupler 209 is in an active phase at the moment of receipt of both redundant copies (801a and 801b), the star coupler 209 forwards both copies of the message 801 to the computing node 108.

FIG. 9 illustrates an example of the application of the action raster for the purpose of redundancy management in a network infrastructure with ring and multiple circulation of a message in the ring. The scenario in FIG. 9 differs from the scenario in FIG. 8 in that the active phase 502 has been selected to be longer, such that a further circulation of the message 801 in the ring is possible. In other words, as illustrated in FIG. 9, the star coupler 209 sends the two copies 801a and 801b of the message 801 not only to the computing node 108, but also forwards a copy to each of the star couplers 207 and 206. As illustrated, the star couplers 207 and 206 forward the messages to the star couplers 204 and 203. The star couplers 204 and 203 forward their messages to the star coupler 201. From this moment, the sending sequence is repeated starting from star coupler 201, as at the start of the scenario. The repetition of the sequence is symbolised by the messages 801c and 801d. Lastly, the star coupler 209 also receives the further redundant copies 801c and 801d of the message 801. Since the active phase has been selected to be long enough, the star coupler 209 also forwards these two copies 801c and 801d to the computing node 108.

FIG. 10 illustrates an example of the application of the action raster for the purpose of redundancy management in a network infrastructure with ring. FIG. 10 relates to the example of a network infrastructure in FIG. 4 and describes, in an exemplary manner on the basis of the communication of computing nodes 107 and 108 via a ring, the application of an action raster as shown in FIG. 5. As illustrated in FIG. 10, the computing node 107 sends a message to the star coupler 201. This star coupler 201 then forwards the message both to the star coupler 203 (symbolised as message 801a) and to the star coupler 204 (symbolised as message 801b). The star coupler 203 forwards the message 801a to star coupler 206, and this forwards the message 801a to the star coupler 209. Star coupler 204 forwards the message 801b to star coupler 207, and this forwards the message 801b likewise to star coupler 209. Star coupler 209 thus receives both redundant copies (801a and 801b) of the message 801. Since the star coupler 209 at the moment of receipt of both redundant copies (801a and 801b) is in an active phase, the star coupler 209 assesses the messages 801a and 801b as redundant copies of the message 801 and forwards only one copy of the message 801, in this case the copy 801a, to the computing node 108.

The invention claimed is:
1. A method for the redundant transmission of messages in a distributed real-time system, wherein the real-time system comprises two or more computing nodes and one or more star couplers, wherein the computing nodes are connected to the star couplers by means of bidirectional communication lines, and the star couplers are interconnected by the bidirectional communication lines, and wherein the star couplers connected by the bidirectional communication lines form a network infrastructure, and wherein at least some of the messages are sent redundantly, and wherein messages belonging to a message stream have the same identity, the method comprising:

performing one or more activity rasters by one or more star couplers of the network infrastructure, wherein an activity raster in each case consists of alternating active phases and rest phases, wherein all active phases of an activity raster have the same active phase duration, and wherein all rest phases of an activity raster have the same rest phase duration, and wherein the activity phase duration and the rest phase duration of an activity raster are the same or different, and assigning each message sent in the network infrastructure in accordance with its identity to precisely one activity raster by the star couplers, and wherein the messages are sent only in active phases, such that a receiver receiving messages detects that the messages are redundant copies of the same message when the receiver receives messages with the same identity within a time interval, which time interval has a duration corresponding to the active phase duration of the activity raster for messages having this identity.

2. The method according to claim 1, wherein all star couplers that perform an activity raster associated with a certain message perform this activity raster in such a way that the star couplers are in an active phase or in a rest phase either in a synchronised manner or in a manner shifted over time by a defined phase.

3. The method according to claim 1, wherein a star coupler only forwards a message received from another star coupler when a moment of receipt and a moment of complete forwarding fall in an active phase of the activity raster belonging to the message.

4. The method according to claim 1, wherein a length of the active phase in an activity raster of a message is selected to be at least a maximum possible duration of one-time sending through the network infrastructure.

5. The method according to claim 4, wherein the length of the active phase in an activity raster of a message is selected to be at least the maximum possible duration of the one-time sending of the message and also a configured number of repetitions through the network infrastructure.

6. The method according to claim 1, wherein a length of the active phase in an activity raster of a message is selected such that it corresponds at least to a maximum possible time shift required by copies of a redundant message through the network infrastructure over redundant paths.

7. The method according to claim 1, wherein a length of the active phase in an activity raster of a message is selected such that it corresponds at least to a maximum possible time shift required by the redundant copies of a message through the network infrastructure in both directions in a ring.

8. The method according to claim 1, wherein a length of the rest phase of an activity raster corresponds at least to a length of an inaccuracy of a synchronisation of local clocks of the distributed real-time system.

9. The method according to claim 1, wherein a length of the rest phase of an activity raster is selected as a function of the associated active phase of the activity raster.

10. The method according to claim 9, wherein the length of the rest phase of an activity raster is selected as an arithmetic multiple of the associated active phase of the activity raster.

11. The method according to claim 1, wherein a star coupler forwards, twice or more, a message or the redundant copy of a message that it receives during an active phase of the associated activity raster.

12. The method according to claim 11, wherein the repeated forwarding of the message is performed only during the current active phase.

13. The method according to claim 12, wherein a defined time interval is provided between two repetitions.

14. The method according to claim 13, wherein the number of repetitions and/or the time interval between two repetitions can be configured.

15. The method according to claim 1, wherein a star coupler forwards precisely one copy of the set of copies of a message received by the star coupler during an active phase of the associated activity raster.

16. The method according to claim 15, wherein a star coupler forwards a first copy of the set of copies of a message that it receives during an active phase of the associated activity raster.

17. The method according to claim 15, wherein a star coupler forwards a last copy of the set of copies of a message that it receives during an active phase of the associated activity raster.

18. The method according to claim 15, wherein a star coupler forwards the one copy of the set of copies of a message at a configured or configurable moment in time in the active phase of the associated activity raster.

19. The method according to claim 15, wherein a star coupler forwards the one copy of the set of copies of a message at a configured or configurable time interval following the start of the receipt of this copy.

20. The method according to claim 19, wherein the time interval corresponds to the period of time required by the star coupler in order to decide to which computing nodes and/or other star couplers the star coupler must forward the message, or the time interval corresponds to the period of time for complete receipt of the copy.

21. The method according to claim 1, wherein a star coupler forwards any subset of copies from a set of copies of a message that it receives during an active phase of the associated activity raster.

22. The method according to claim 1, wherein one or more star couplers rejects/reject messages received directly from a computing node when the messages are received in the star coupler during a rest phase associated with the message.

23. The method according to claim 1, wherein one or more star couplers reject messages received directly from a computing node when the message is received in the star coupler during an active phase associated with the message, but the forwarding of this message cannot be completed in this active phase.

24. The method according to claim 1, wherein one or more star couplers which receive redundant copies of a message directly from a computing node together carry out an Agreement Protocol, and each of these star couplers separately identifies, in accordance with this Agreement Protocol, at most one activity phase during which the one or more redundant copies of the message are forwarded.

25. The method according to claim 1, wherein one or more star couplers distinguish between two groups of communication lines by means of which they are directly connected, wherein the least one star coupler, during an active phase of an activity raster of a message, forwards the message only at the communication lines of the first group, and during the rest phase of an activity raster of a message forwards the message only at the communication lines of the second group.

26. The method according to claim 25, wherein the length of the active phase in an activity raster of a message is selected in such a way that it corresponds at least to a period of time required by a message to be sent a defined number of times along a ring.

27. The method according to claim 1, wherein a star coupler implements one or more activity rasters by local clocks.

28. The method according to claim 27, wherein the local clocks of different star couplers that implement one or more activity rasters are synchronised with one another.

29. A network infrastructure for a distributed real-time system, wherein the distributed real-time system comprises:
two or more computing nodes and one or more star couplers, wherein the computing nodes are connected to the star couplers by means of bidirectional communication lines and the star couplers are interconnected by the bidirectional communication lines and wherein the network infrastructure is formed by the star couplers connected by the bidirectional communication lines, and wherein at least some of the messages are sent redundantly, and wherein messages belonging to a message stream have the same identity,
for the redundant transmission of messages in the real-time system, one or more star couplers of the network infrastructure are configured to perform one or more activity raster, wherein an activity raster consists of alternating active phases and rest phases, wherein all active phases of an activity raster have the same active phase duration, and wherein all rest phases of an activity raster have the same rest phase duration, and wherein the activity phase duration and the rest phase duration of an activity raster are the same or different, and wherein
the star couplers are configured to assign each message sent in the network infrastructure in accordance with its identity to precisely one activity raster, such that the messages are sent only in active phases, such that a receiver, when receiving messages, detects that the messages are copies of the same message when the receiver receives messages with the same identity within a time interval, which time interval has a duration corresponding to the active phase duration of the activity raster for messages having this identity.

30. The network infrastructure according to claim 29, wherein all star couplers that perform an activity raster associated with a certain message perform this activity raster in such a way that the star couplers are in an active phase or in a rest phase either in a synchronised manner or in a manner shifted over time by a defined phase.

31. The network infrastructure according to claim 29, wherein a star coupler only forwards a message received from another star coupler when a moment of receipt and a moment of complete forwarding fall in an active phase of the activity raster belonging to the message.

32. The network infrastructure according to claim 29, wherein a length of the active phase in an activity raster of a message is selected to be at least a maximum possible duration of one-time sending through the network infrastructure.

33. The network infrastructure according to claim 32, wherein the length of the active phase in an activity raster of a message is selected to be at least the maximum possible duration of the one-time sending of the message and also a configured number of repetitions through the network infrastructure.

34. The network infrastructure according to claim 29, wherein a length of the active phase in an activity raster of a message is selected such that it corresponds at least to a maximum possible time shift required by the copies of a redundant message through the network infrastructure over redundant paths.

35. The network infrastructure according to claim 29, wherein a length of the active phase in an activity raster of a message is selected such that it corresponds at least to maximum possible time shift required by the redundant copies of a message through the network infrastructure in both directions in a ring.

36. The network infrastructure according to claim 29, wherein a length of the rest phase of an activity raster corresponds at least to the length of an inaccuracy of a synchronisation of local clocks of the distributed real-time system.

37. The network infrastructure according to claim 29, wherein a length of the rest phase of an activity raster is selected as a function of the associated active phase of the activity raster.

38. The network infrastructure according to claim 37, wherein a length of the rest phase of an activity raster is selected as an arithmetic multiple of the associated active phase of the activity raster.

39. The network infrastructure according to claim 29, wherein a star coupler forwards, twice or more, a message or the redundant copy of a message that it receives during an active phase of the associated activity raster.

40. The network infrastructure according to claim 39, wherein the repeated forwarding of the message is performed only during the current active phase.

41. The network infrastructure according to claim 40, wherein a defined time interval is provided between two repetitions.

42. The network infrastructure according to claim 41, wherein the number of repetitions or the time interval between two repetitions can be configured.

43. The network infrastructure according to claim 29, wherein a star coupler forwards precisely one copy of the set of copies of a message received by the star coupler during an active phase of the associated activity raster.

44. The network infrastructure according to claim 43, wherein a star coupler forwards a first copy of the set of copies of a message that it receives during an active phase of the associated activity raster.

45. The network infrastructure according to claim 43, wherein a star coupler forwards a last copy of the set of copies of a message that it receives during an active phase of the associated activity raster.

46. The network infrastructure according to claim 43, wherein a star coupler forwards the one copy of the set of copies of a message at a defined moment in time in the active phase of the associated activity raster.

47. The network infrastructure according to claim 43, wherein a star coupler forwards the one copy of the set of copies of a message at a configured or configurable time interval following the start of the receipt of this copy.

48. The network infrastructure according to claim 47, wherein the time interval corresponds to a period of time required by the star coupler in order to decide to which computing nodes or other star couplers the star coupler must forward the message, or the time interval corresponds to a period of time for complete receipt of the copy.

49. The network infrastructure according to claim 29, wherein a star coupler forwards any subset of copies from the set of copies of a message that it receives during an active phase of the associated activity raster.

50. The network infrastructure according to claim 29, wherein one or more star couplers reject messages received directly from a computing node when the messages are received in the star coupler during a rest phase associated with the message.

51. The network infrastructure according to claim 29, wherein one or more star couplers reject messages received directly from a computing node when the message is received in the star coupler during an active phase associated with the message, but the forwarding of this message cannot be completed in this active phase.

52. The network infrastructure according to claim 20, wherein one or more star couplers which receive redundant copies of a message directly from a computing node together carry out an Agreement Protocol, and each of these star couplers separately identifies, in accordance with this Agreement Protocol, at most one activity phase during which the one or more redundant copies of the message are forwarded.

53. The network infrastructure according to claim 29, wherein one or more star couplers distinguish between two groups of communication lines by means of which they are directly connected, wherein the least one star coupler, during an active phase of an activity raster of a message, forwards the message only at the communication lines of a first group, and during the rest phase of the activity raster of a message forwards the message only at the communication lines of a second group.

54. The network infrastructure according to claim 53, wherein a length of the active phase in an activity raster of a message is selected in such a way that it corresponds at least to a period of time required by a message to be sent a defined number of times along a ring.

55. The network infrastructure according to claim 29, wherein a star coupler implements one or more activity rasters by local clocks.

56. The network infrastructure according to claim 55, wherein the local clocks of different star couplers that implement one or more activity rasters are synchronised with one another.

* * * * *

UNITED STATES PATENT AND TRADEMARK OFFICE
CERTIFICATE OF CORRECTION

PATENT NO. : 9,628,327 B2
APPLICATION NO. : 14/771351
DATED : April 18, 2017
INVENTOR(S) : Angelow et al.

Page 1 of 1

It is certified that error appears in the above-identified patent and that said Letters Patent is hereby corrected as shown below:

In the Specification

Column 2, Lines 26, 27, please change "message current" to -- current message --
Column 4, Line 28, please change "with different" to -- with a different --
Column 6, Line 14, please change "the least" to -- the at least --
Column 6, Line 33, please change "drawing" to -- drawings --
Column 6, Line 34, please change "drawing" to -- drawings --
Column 8, Line 29, please change "have different" to -- have a different --
Column 9, Line 27, please change "node 501" to -- node 105 --
Column 9, Line 57, please change "with ring." to -- with a ring. --

In the Claims

Column 12, Line 37 (Claim 22), please change "couplers rejects/reject" to -- couplers reject --
Column 12, Line 57 (Claim 25), please change "the least" to -- the at least --
Column 13, Line 22 (Claim 29), please change "activity raster" to -- activity rasters --
Column 14, Lines 3, 4 (Claim 35), please change "to maximum" to -- to a maximum --
Column 15, Line 17 (Claim 53), please change "the least" to -- the at least --

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*